United States Patent [19]
Nash et al.

[11] Patent Number: 4,809,347
[45] Date of Patent: Feb. 28, 1989

[54] COMPUTER VISION ARCHITECTURE

[75] Inventors: James G. Nash, Los Angeles; David B. Shu, Canoga Park, both of Calif.

[73] Assignee: Hughes Aircraft Company, Los Angeles, Calif.

[21] Appl. No.: 887,847

[22] Filed: Jul. 18, 1986

[51] Int. Cl.$^4$ .............................................. G06K 9/00
[52] U.S. Cl. ..................... 382/49; 307/440; 364/133; 382/27
[58] Field of Search ................ 382/41, 49, 34, 27; 364/133, 131; 307/440, 446

[56] References Cited

U.S. PATENT DOCUMENTS

| | | | |
|---|---|---|---|
| 4,015,240 | 3/1977 | Swonger | 382/56 |
| 4,215,401 | 7/1980 | Holsztynski | 382/41 |
| 4,309,691 | 1/1982 | Castleman | 382/6 |
| 4,351,025 | 9/1982 | Hall | 364/133 |
| 4,447,886 | 5/1984 | Meeker | 382/43 |
| 4,484,349 | 11/1984 | McCubbrey | 382/41 |
| 4,524,428 | 6/1985 | Grinberg | 364/900 |
| 4,556,955 | 12/1985 | Wright | 364/133 |
| 4,601,055 | 7/1986 | Kent | 382/41 |
| 4,611,347 | 9/1986 | Netravali | 382/34 |
| 4,622,632 | 11/1986 | Tanimoto | 364/200 |
| 4,653,112 | 3/1987 | Auimette | 382/41 |
| 4,665,556 | 5/1987 | Fukushima et al. | 382/49 |

OTHER PUBLICATIONS

"A Symbolic Pixel Array for Representation of Spatial Knowledge," Proceedings of the Third Annular International Phoenix Conferences on Computers and Communications, D. W. Payton, (1984), pp. 153-157.

"Hierarchical Knowledge-Directed Object Extraction Using a Combined Region and Line Representation," Proceedings of Image Workshop, Reynolds, Irwin, Hanson and Riseman (1984), pp. 195 thru 204.

"Iconic to Symbolic Proceedings Using a Content Addressable Array Parallel Processor," Proceedings of Image Understanding Workshop, (1984), pp. 316-332, by Lawton, Levitan, Weems, Riseman, and Hanson.

"An Expert System for Object Recognition in Natural Scenes," J. H. Kim et al., IEEE Journal 1984, pp. 170-175.

"Signal to Symbols:Unblocking the Vision Communications/Control Bottleneck", Steven P. Levitan, Charles C. Weems and Edward M. Riseman; VLSI Signal Processing; pp. 411-420, Nov. 1984.

Moldovan et al., "Parallel Processing of Iconic to Symbolic Transformation of Images", IEEE Proceedings on Computer Vision and Pattern Recognition, San Francisco, Calif., Jun. 19-25, 1985, pp. 257-264.

V. Cantoni et al.: "PAPIA: Pyramidal Architecture for Parallel Image Analysis", Proceedings 7th Symposium on Computer Arithmetic, Ubana, Ill., 4-6 Jun. 1985, IEEE, (U.S.), pp. 237-242.

R. M. Logheed et al.: "Multi-Processor Architectures for Machine Vision and Image Analysis", Proceedings of the 1985 International Conference on Parallel Proceeding, 20-23 Aug. 1985, IEEE (U.S.), pp. 493-497.

Primary Examiner—Leo H. Boudreau
Attorney, Agent, or Firm—V. D. Duraiswamy; A. W. Karambelas

[57] ABSTRACT

A computer architecture is disclosed for analyzing automatic image understanding problems. The architecture is designed so that it can efficiently perform a wide spectrum of tasks ranging from low level or iconic processing to high level or symbolic processing tasks. A first level (12) of image processing elements is provided for operating on the image matrix on a pixel per processing element basis. A second level (14) of processing elements is provided for operating on a plurality of pixels associated with a given array of first level processing elements. A third level (16) of processing elements is designed to instruct the first and second level processing elements, as well as for operating on a larger segment of the matrix. A host computer (18) is provided that directly communicates with at least each third level processing element. A high degree of parallelism is provided so that information can be readily transferred within the architecture at high speeds.

34 Claims, 16 Drawing Sheets

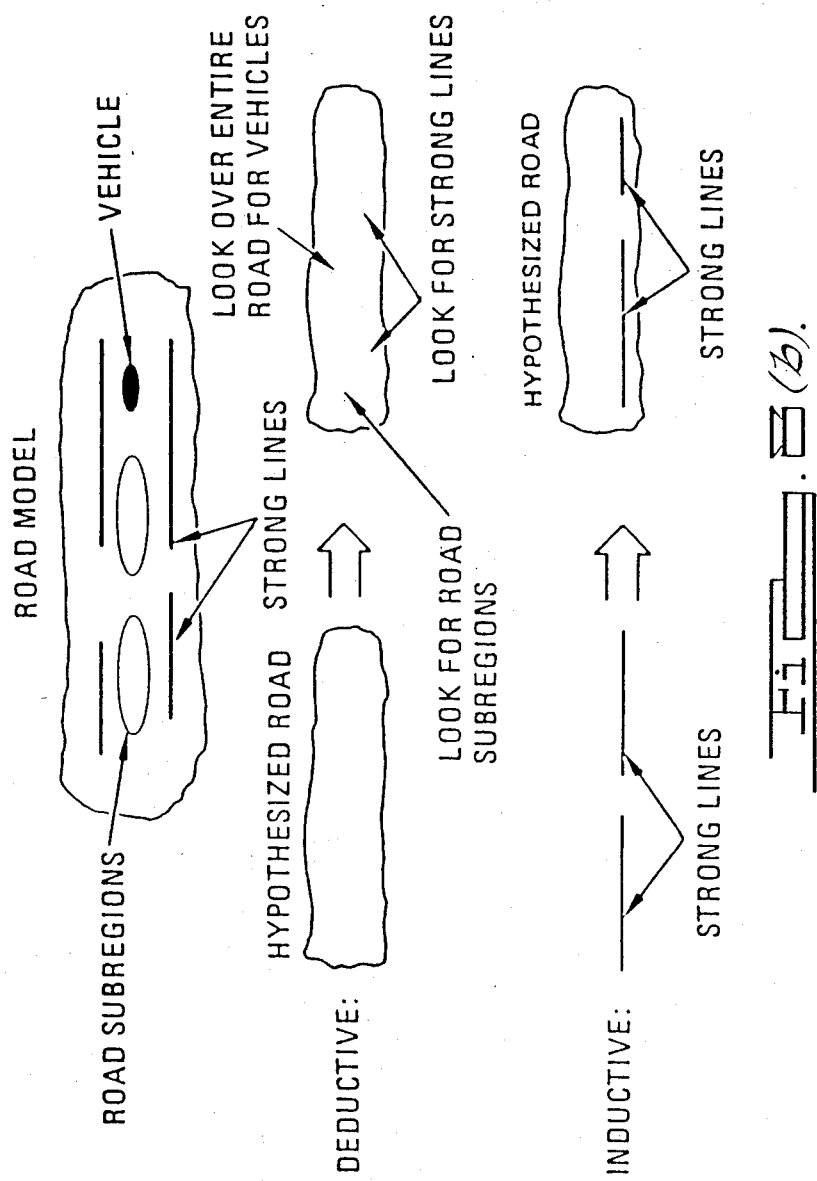

← ICP PE row address, ICP PE column address →

|   | 0 | 1 | 2 | 3 | 4 | 5 | 6 | 7 |
|---|---|---|---|---|---|---|---|---|
| 0 | sceneobj-1<br>area: xxx<br>peri: xxx<br>tact: NIL<br>terr: NIL<br>space: NIL | | | | | | sceneobj-4<br>area: xxx<br>peri: xxx<br>tact: NIL<br>terr: NIL<br>space: NIL | sceneobj-2<br>area: xxx<br>peri: xxx<br>tact: NIL<br>terr: NIL<br>space: NIL |
| 1 | | | | | sceneobj-5<br>area: xxx<br>peri: xxx<br>tact: NIL<br>terr: NIL<br>space: NIL | | | |
| 2 | sceneobj-3<br>area: xxx<br>peri: xxx<br>tact: NIL<br>terr: NIL<br>space: NIL | | | | sceneobj-7<br>area: xxx<br>peri: xxx<br>tact: NIL<br>terr: NIL<br>space: NIL | | | sceneobj-6<br>area: xxx<br>peri: xxx<br>tact: NIL<br>terr: NIL<br>space: NIL |
| 3 | | | | sceneobj-13<br>area: xxx<br>peri: xxx<br>tact: NIL<br>terr: NIL<br>space: NIL | | | | |
| 4 | sceneobj-10<br>area: xxx<br>peri: xxx<br>tact: NIL<br>terr: NIL<br>space: NIL | | | | | | sceneobj-8<br>area: xxx<br>peri: xxx<br>tact: NIL<br>terr: NIL<br>space: NIL | |
| 5 | | | | sceneobj-11<br>area: xxx<br>peri: xxx<br>tact: NIL<br>terr: NIL<br>space: NIL | | | | |
| 6 | | | | | | | sceneobj-12<br>area: xxx<br>peri: xxx<br>tact: NIL<br>terr: NIL<br>space: NIL | |
| 7 | | | | | | | | |

FIG. 9.

|   | 0 | 1 | 2 | 3 | 4 | 5 | 6 | 7 |
|---|---|---|---|---|---|---|---|---|
| 0 | | | | | | | | |
| 1 | | | | | | | | |
| 2 | | sceneobj-3<br>area: xxx<br>peri: xxx<br>tact: 2,1<br>terr: NIL<br>space: NIL | tactical-3<br>texture eng<br>ded : xxx<br>ind : xxx<br>fixed: 3,1<br>mobil: NIL | | | | | |
| 3 | | | | | | | | |
| 4 | | sceneobj-10<br>area: xxx<br>peri: xxx<br>tact: 4,1<br>terr: NIL<br>space: NIL | tactical-10<br>texture eng<br>ded : xxx<br>ind : xxx<br>fixed: NIL<br>mobil: 5,1 | | | | sceneobj-8<br>area: xxx<br>peri: xxx<br>tact: 4,7<br>terr: NIL<br>space: NIL | tactical-8<br>texture eng<br>ded : xxx<br>ind : xxx<br>fixed: NIL<br>mobil: 5,7 |
| 5 | | | | sceneobj-11<br>area: xxx<br>peri: xxx<br>tact: 6,3<br>terr: 5,4<br>space: NIL | | | | |
| 6 | | | | tactical-11<br>texture eng<br>ded : xxx<br>ind : xxx<br>fixed: NIL<br>mobil: NIL | | | sceneobj-12<br>area: xxx<br>peri: xxx<br>tact: 6,7<br>terr: NIL<br>space: NIL | tactical-12<br>texture eng<br>ded : xxx<br>ind : xxx<br>fixed: 7,6<br>mobil: 7,7 |
| 7 | | | | | | | | |

← ICP PE row address, ICP PE column address →

FIG. 10.

ICP PE row address,     ICP PE column address

|   | 0 | 1 | 2 | 3 | 4 | 5 | 6 | 7 |
|---|---|---|---|---|---|---|---|---|
| 0 | | | | | | | | |
| 1 | | | | | | | | |
| 2 | | | | | | | | |
| 3 | | | | | | | | |
| 4 | sceneobj-10<br>area: xxx<br>peri: xxx<br>tact: 4,1<br>terr: NIL<br>space: NIL | tactical-10<br>texture eng<br>ded: xxx<br>ind: xxx<br>fixed: NIL<br>mobil: 5,1 | | | | | | |
| 5 | | mobil-10<br>texture eng<br>ded: 5,2<br>ind: 2,3<br>tire: NIL<br>tracked: NIL | wheel-14<br>texture eng<br>ded: xxx<br>ind: 5,1 | | | | | |
| 6 | | sceneobj-14<br>area: xxx<br>peri: xxx<br>GMI, IMI<br>CMI<br>wheel: 5,2 | | | | | sceneobj-12<br>area: xxx<br>peri: xxx<br>tact: 6,7<br>terr: NIL<br>space: NIL | tactical-12<br>texture eng<br>ded: xxx<br>ind: xxx<br>fixed: 7,6<br>mobil: 7,7 |
| 7 | | | | APC-12<br>texture eng<br>ded: xxx<br>ind: xxx<br>tank: NIL<br>APC: 7,3 | tracked-12<br>texture eng<br>ded: xxx<br>ind: xxx<br>truck: NIL<br>jeep: NIL | tire-12<br>texture eng<br>ded: xxx<br>ind: xxx<br>building: NIL | fixed-12<br>texture eng<br>ded: xxx<br>ind: xxx<br>tire: 7,5<br>tracked: 7, | mobil-12<br>texture eng<br>ded: xxx<br>ind: xxx |

Fig. 11.

← ICP PE row address,    ICP PE column address →

| | 0 | 1 | 2 | 3 | 4 | 5 | 6 | 7 |
|---|---|---|---|---|---|---|---|---|
| 0 | sceneobj-t<br>area: xxx<br>peri: xxx<br>tact: NIL<br>terr: 0,1<br>space: 1,0 | terrain-1<br>texture eng<br>ded : xxx<br>ind : xxx<br>land: NIL<br>water: NIL | | land-4<br>texture eng<br>ded : xxx<br>ind : xxx<br>tree: NIL<br>path: 1,3 | terrain-4<br>texture eng<br>ded : xxx<br>ind : xxx<br>land : 0,3<br>water: NIL | sceneobj-4<br>area: xxx<br>peri: xxx<br>tact: NIL<br>terr: 0,4<br>space: NIL | sceneobj-2<br>area: xxx<br>peri: xxx<br>tact: NIL<br>terr: NIL<br>space: 0,7 | space-2<br>texture eng<br>ded : xxx<br>ind : xxx<br>sky : NIL |
| 1 | space-1<br>texture eng<br>ded : xxx<br>ind : xxx<br>sky : 1,1 | sky-1<br>texture eng<br>ded : xxx<br>ind : xxx | | path-4<br>texture eng<br>ded : xxx<br>ind : xxx<br>road : 2,3<br>track: NIL | sceneobj-5<br>area: xxx<br>peri: xxx<br>tact: NIL<br>terr: NIL<br>space: NIL | | | |
| 2 | sceneobj-3<br>area: xxx<br>peri: xxx<br>tact: 2,1<br>terr: NIL<br>space: NIL | tactical-3<br>texture eng<br>ded : xxx<br>ind : xxx<br>fixed: 3,1<br>mobil: NIL | | road-4<br>texture eng<br>ded : xxx<br>ind : xxx | sceneobj-7<br>area: xxx<br>peri: xxx<br>tact: NIL<br>terr: 2,5<br>space: NIL | terrain-7<br>texture eng<br>ded : xxx<br>ind : xxx<br>land : 3,5<br>water: NIL | | sceneobj-6<br>area: xxx<br>peri: xxx<br>tact: NIL<br>terr: NIL<br>space: NIL |
| 3 | | fixed-3<br>texture eng<br>ded : xxx<br>ind : xxx<br>building:3,2 | building-3<br>texture eng<br>ded : xxx<br>ind : xxx | sceneobj-13<br>area: xxx<br>peri: xxx<br>tact: NIL<br>terr: NIL<br>space: NIL | path-7<br>texture eng<br>ded : xxx<br>ind : xxx | land-7<br>texture eng<br>ded : xxx<br>ind : xxx<br>tree: NIL<br>path: 3,4 | | |
| 4 | sceneobj-10<br>area: xxx<br>peri: xxx<br>tact: 4,1<br>terr: NIL<br>space: NIL | tactical-10<br>texture eng<br>ded : xxx<br>ind : xxx<br>fixed: NIL<br>mobil: 5,1 | | | | | sceneobj-8<br>area: xxx<br>peri: xxx<br>tact: 4,7<br>terr: NIL<br>space: NIL | tactical-8<br>texture eng<br>ded : xxx<br>ind : xxx<br>fixed: NIL<br>mobil: 5,7 |
| 5 | | mobil-10<br>texture eng<br>ded : 5,2<br>ind : 2,3<br>tire: NIL<br>tracked: NIL | wheel-14<br>texture eng<br>ded : xxx<br>ind : 5,1 | sceneobj-11<br>area: xxx<br>peri: xxx<br>tact: NIL<br>terr: 5,4<br>space: NIL | terrain-11<br>texture eng<br>ded : xxx<br>ind : xxx<br>land : 5,5<br>water: NIL | land-11<br>texture eng<br>ded : xxx<br>ind : xxx<br>tree: 5,6<br>path: NIL | tree-11<br>texture eng<br>ded : xxx<br>ind : xxx | mobil-8<br>texture eng<br>ded : xxx<br>ind : xxx<br>tire : NIL<br>tracked: 6,5 |
| 6 | | sceneobj-14<br>area : xxx<br>peri : xxx<br>GM,IM<br>CM<br>wheel : 5,2 | | | | | tracked-8<br>texture eng<br>ded : xxx<br>ind : xxx<br>tank : NIL<br>APC : NIL | sceneobj-12<br>area: xxx<br>peri: xxx<br>tact: 6,7<br>terr: NIL<br>space: NIL | tactical-12<br>texture eng<br>ded : xxx<br>ind : xxx<br>fixed: 7,6<br>mobil: 7,7 |
| 7 | | | | APC-12<br>texture eng<br>ded : xxx<br>ind : xxx<br>tank : NIL<br>APC : 7,3 | tracked-12<br>texture eng<br>ded : xxx<br>ind : xxx<br>truck: NIL<br>jeep : NIL | tire-12<br>texture eng<br>ded : xxx<br>ind : xxx<br>building:NIL | fixed-12<br>texture eng<br>ded : xxx<br>ind : xxx<br>tire : 7,5<br>tracked: 7,4 | mobil-12<br>texture eng<br>ded : xxx<br>ind : xxx | |

FIG. 12.

COMPUTER VISION ARCHITECTURE

BACKGROUND OF THE INVENTION

1. Technical Field

This invention relates to image understanding machines and, more particularly, to computer architectures capable of both arithmetic or iconic and symbolic processing of image data.

2. Description of Related Art

There exists a need for a computer system that is capable of both arithmetic or iconic and symbolic processing of image data which is designed specifically for use in computer vision research and analyses efforts. Such a system can be used in a variety of different applications such as for use in real time processing of data from radar, infrared and visible sensors in areas such as aircraft navigation and reconnaissance. Another application of such a machine would be as a development system for use in vision laboratories in the implementation and simulation of many computationally intensive algorithms.

Machines which are capable of operating on image data (as compared to merely arithmetic data) are referred to alternatively as image processors, vision computers, image understanding machines and the like. Image understanding machines are sometimes thought of as a higher level machine than an image processor which is typically referred to as a machine for enhancing and classifying images whereas an image understanding machine involves the automatic transformation of the image to symbolic form, effectively providing a high level description of the image in terms of objects, their attributes, and their relationship to other objects in the image. The present invention is directed to this latter type of machine (although it can do the lower level tasks as well) and shall be referred to as an image understanding machine (IUM).

It is generally recognized that a high level IUM must be capable of performing two basic types of computations: arithmetic or iconic processing and symbolic manipulation. It would be desirable to provide an IUM that is capable of performing a number of visual information processing algorithms such as those listed in the following Table I.

TABLE I

A. LOW LEVEL VISION
  Edge Detection
    Differentiation
    Edge fitting
    Template matching
    Convolution
    Transform methods
    Histogramming
    Thresholding
    Local segmentation
B. MID LEVEL VISION
  Line and Curve Fitting
    Hough Transform
    Projection
    Graph search
  Segmentation
    Recursive segmentation
    Region growing
    Boundary tracing
  Inference of 3-D surfaces
    Stereo
    Shape from shading and shadows
    Motion analysis
  Shape analysis TABLE I-continued 2-D features
    Generalized cones
  Structures
    Projection, rotation
    Angles and transcendentals
    Hough-like parameter spaces
  Surfaces
    Graph operations
    Color constancy
    Surface interpolation
    Structure from motion
    Iterative least squares
C. HIGH LEVEL VISION
  Object recognition
    Graph matching
    Relaxation labeling
    Line matching
    Constraint satisfaction
    Symbolic modeling and manipulation
    Geometric reasoning
  Scene inferences
    Analysis using contextual information
    Production systems It should be noted that future algorithmic developments will be a continually and rapidly evolving activity resulting from changing applications, advances in sensor and solid state technologies, and the need for added intelligence to deal even more rapidly and effectively with ever increasing amounts of raw data.

Many of the known concurrent or parallel processing computer architectures are not specifically intended to be used for image understanding purposes. Other image processing systems also suffer from the inability to efficiently perform both numeric and symbolic computations. For example, some of the prior architectures do not lend themselves to efficiently execute various artificial intelligent techniques such as frames, rules and evidential reasoning, while at the same time being capable of efficiently doing more iconic related image processing algorithms. One of the major drawbacks in the prior computer architectures was that their designs generally necessitated the transfer of large amounts of data between a host computer and the special purpose vision computer. Unfortunately, the transfer of data and instructions in the known architectures resulted in relatively slow operational speed. It is, of course, one of the ultimate objectives in any computer system to increase the speed of operation without unduly increasing costs or complexity of operation.

SUMMARY OF THE INVENTION

Pursuant to the present invention, a computer architecture for an image understanding machine is provided for performing both iconic and symbolic operations on image data in the form of a matrix of pixels. The machine includes a first level of image processing elements (PEs) for operating on the image matrix on a pixel per processing element basis. Each PE of the first level is adapted to communicate with each other. A second level of processing elements is provided for operating on a plurality of pixels associated with a given array of the PEs of the first level. Each second level processing element is associated with a group of first level processing elements and communicates therewith as well as with other second level processing elements. A third level of processing elements is provided for performing such functions as instructing the first and second level PEs. It is also designed to operate on a larger segment of the matrix than the second level processing elements. Each third level processing element is associated with a given number of second level processing elements and communicates therewith as well as with other third level processing elements. A host computer communicating with at least each third level processing element is provided for performing such functions as instructing the third level PEs.

The computer architecture of the present invention is designed to solve the problem of the disparities in granularity from iconic processing to symbolic processing. By the term "granularity" it is meant that the processing power of each PE at a given level is comparable to the area (i.e., grain size) of the image segment associated with it. The larger the grain size the more powerful the PE becomes.

The architecture of the present invention provides an efficient implementation match at each level of granularity. Thus, for iconic processing which requires the smallest granularity, a processor per pixel approach is provided (i.e., the first level processing elements) to efficiently perform these tasks. On the other hand, for higher level or more sophisticated operations the third level processing elements are provided which can be implemented in the form of general purpose microprocessors.

The computer architecture of this invention also provides parallelism at substantially all levels of computation. Thus, bottlenecks which are often associated with serial computations or communications are avoided. The approach of the present invention also provides an effective means of communication back and forth between signal processing activities and the symbolic activities. The interconnection system of the machine of this invention connects different types of concurrent processors in such a way as to match the characteristics of most computer vision problems and the manner in which they are solved by way of implementing various algorithms. In addition, the architecture provides a modular, reliable and relatively low cost approach.

Among the advantages and characteristics of the present invention include:
  hardware to match problem granularity,
  parallel operation throughout problem,
  high efficiency for symbolic operation,
  the capability to perform both low-level (iconic) and high-level (symbolic) processing,
  a high degree of parallelism (up to $10^6$ concurrent elements),
  three levels of parallelism in system hierarchy,
  a highly testable structure of identical elements,
  optimal locality of operation—data essentially remains in place throughout,
  minimal demands on global data bus bandwidth,
  and identical processing elements of relatively simple design.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

A. Overview

Figure 1:
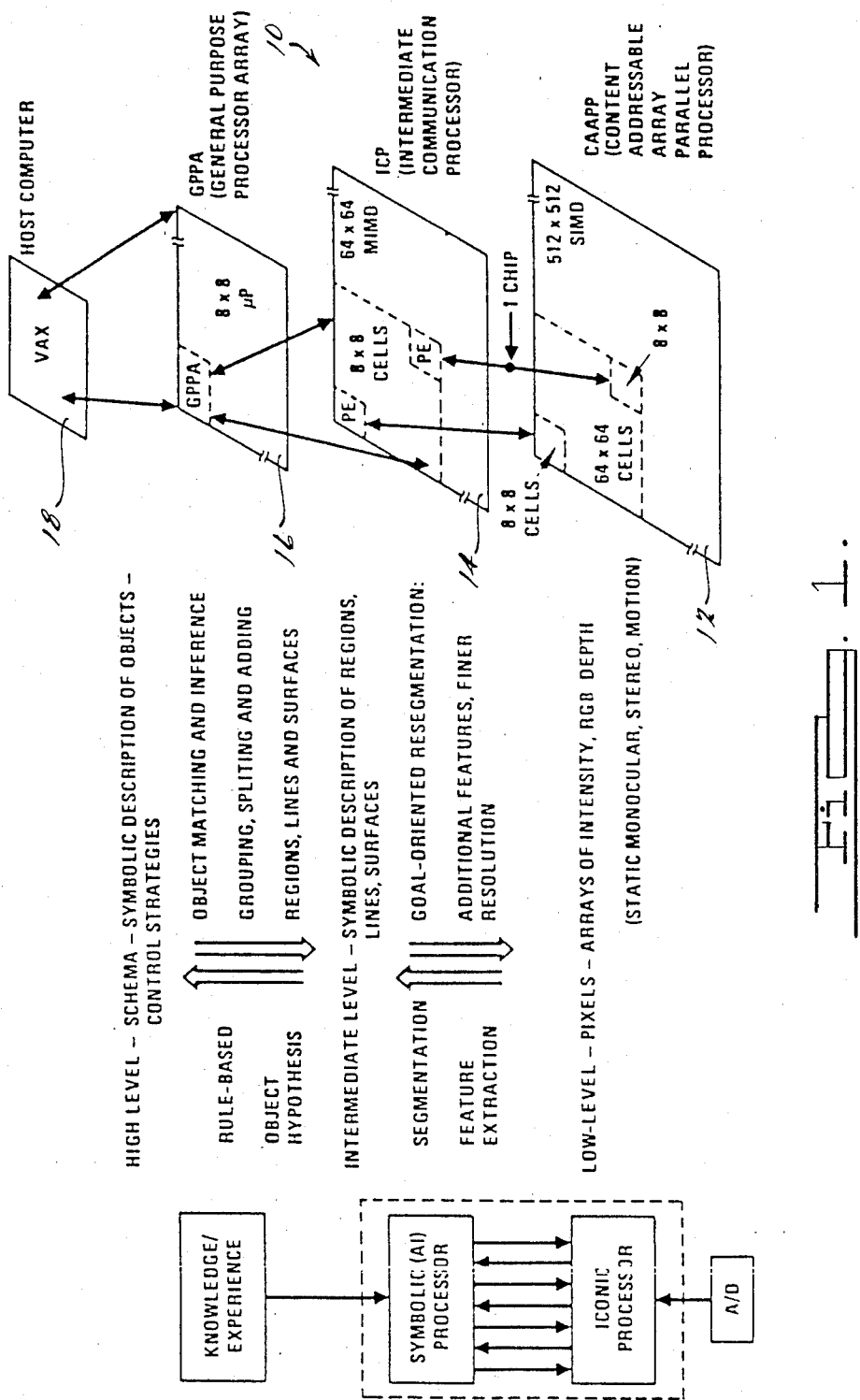
FIG. 1 is a functional diagrammatic view of an image understanding machine made in accordance with the teachings of the present invention.

The computer architecture for the image understanding machine 10 of the preferred embodiment is shown in FIG. 1. The architecture is based on a hierarchical organization having four levels of processing elements. For purposes of this invention, the term "processing element" is defined as a computational module consisting of a central processing unit (CPU), a memory, and an associated communication unit permitting transfer of data into and out of the module.

The first level 12 of processing elements is a 512×512 array of content addressable parallel processors (CAAPP). CAAPP 12 is a mesh-connected, bit-serial array of processing elements having an associative or content-addressable parallel processing capability. The term "mesh connected" means that connections are provided to neighboring PEs in the north east, west, and south directions. A "bit-serial array" is an array of PEs, each of which can operate on bit operands and generate one result bit with an appropriate carry bit. For purposes of this invention the terms "associative or content- addressable parallel processing capability" means that all of the PEs in the array can simultaneously match a given pattern against a portion of its memory and flag the individual result.

At the next higher level or second level 14, a 64×64 intermediate communication processor array (ICP) is provided. Each processing element (PE) of the ICP array is a multi-bit parallel processor. Presently a 16-bit parallel processor design is preferred. A third level 16 consists of an 8×8 general purpose processor array (GPPA) where each PE in that level is a powerful 32-bit microprocessor such as Motorola 68020. At the highest level 18 there is provided a system controller or host computer such as a VAX Model No. 11/750 computer manufactured by Digital Equipment Corporation.

Image data can be collected from a wide variety of sensors known in the art. Machine 10 is designed to operate on such image data which generally takes the form of a matrix of picture elements or pixels. Typically, each pixel contains a value of from 0 to 255 depending upon characteristics of points in the scene with which the pixel is associated. Each picture or frame of a given scene is generally represented by an N×N matrix where N is typically 512 or 256. The machine 10 of the present invention contains a sufficient number of low level 12 processing elements (512×512) such that there is provided at least one PE per pixel in the image matrix being analyzed. Thus, each CAAPP PE is adapted to operate on the image matrix on a pixel per PE basis. Machine 10 is constructed such that each CAAPP PE is mesh connected so that it can communicate with each of its neighboring PEs in all directions so that each CAAPP PE can thereby communicate with each PE in that level.

Each PE in the ICP level 14 is associated with an array of CAAPP PEs. In the preferred embodiment, each ICP PE is connected to an 8×8 array of CAAPP PEs. Consequently, each ICP PE is capable of operating on 64 pixels of the matrix. Each ICP PE is constructed so that it communicates with other ICP PEs as well as with the CAAPP PE array to which it is associated. Each GPPA PE is adapted to instruct the CAAPP and ICP processing elements to which it is associated, as well as to operate on a larger segment of the image matrix than the ICP PEs. The GPPA processing elements are associated with a given number of ICP processing elements and communicate therewith, as well as with other GPPA processing elements. In this embodiment, each GPPA processor is designed to operate on 4,096 pixels in the image matrix.

Figure 2:
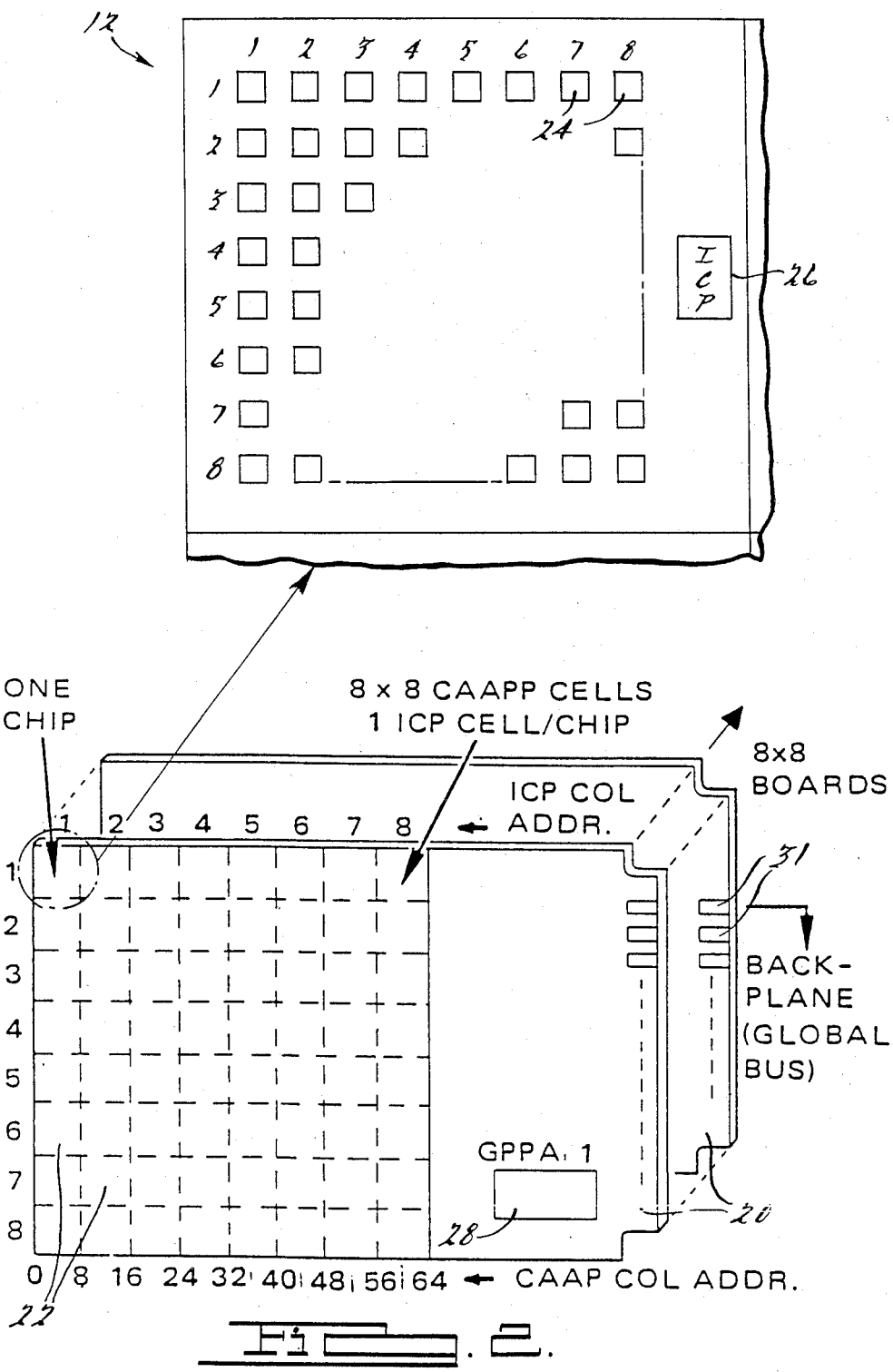
FIG. 2 is a perspective view schematically illustrating the organization of the various processing elements on a plurality of circuit boards.

The machine 10 of the present invention can be readily implemented, for example, by the construction illustrated in FIG. 2. Each circuit board 20 contains an 8×8 array of integrated circuit chips 22. Each chip 22 contains an 8×8 array of CAAPP PEs 24 and one ICP PE 26, integrated together as a single entity on a semiconductor. Each circuit board 20 will include one GPPA PE 28. By duplicating the printed circuit board structures shown in FIG. 2 it is possible to build an entire machine 10 with a theoretically unlimited capacity.

The CAAPP level 12 is designed to function primarily in the iconic domain, i.e., where the operations are based primarily on arithmetic manipulations of the image data. However, the CAAPP level is also capable of providing primitive symbolic information to the ICP level 14 and for performing low granularity symbolic operations. The ICP level 14 is designed primarily for intermediate level symbolic operations such as subgraph matching in conjunction with the CAAPP level processing. The GPPA level 16 serves as a controller for instructing the processing elements of the ICP and CAAPP levels. It also can be used to provide a capability for efficient allocation of resources and as a local general purpose processor.

Figure 3:
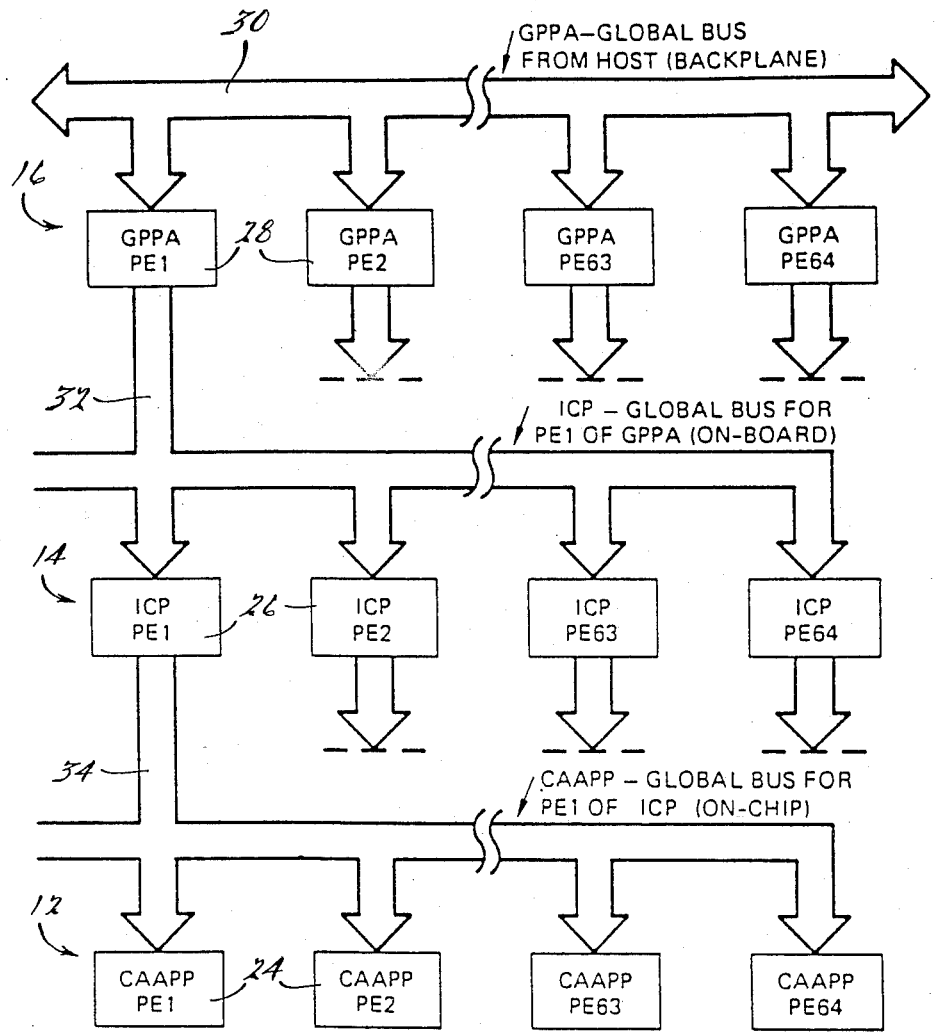
FIG. 3 is a schematic diagram showing the bus structure for communication with the various level of processing elements.

The global bus 30 is shown in FIG. 3. The global bus 30 communicates with each of the PEs in the GPPA level 16. Bus 30 is provided in part by way of connectors 31 (FIG. 2) on each of the circuit boards 20 and thus corresponds to the backplane of the printed circuit boards. As a result, each GPPA PE 28 can communicate with each other. Each GPPA PE also can communicate with its associated array of ICP PEs 26 by way of an on-board bus 32. Likewise, each ICP PE 26 can communicate with its associated array of CAAPP PEs 24 by an on-chip bus 34. In such manner the host computer 18 is connected to each PEs of the different levels so that a command over the global bus 30 can be directed to any of the PEs. For example, it would be possible for each ICP, PE to be requesting different information from its local 8×8 CAAPP PEs. If all CAAPP PEs were responding to a central controller, this would have to be done serially thereby unduly increasing processing times in many instances.

Figure 16:
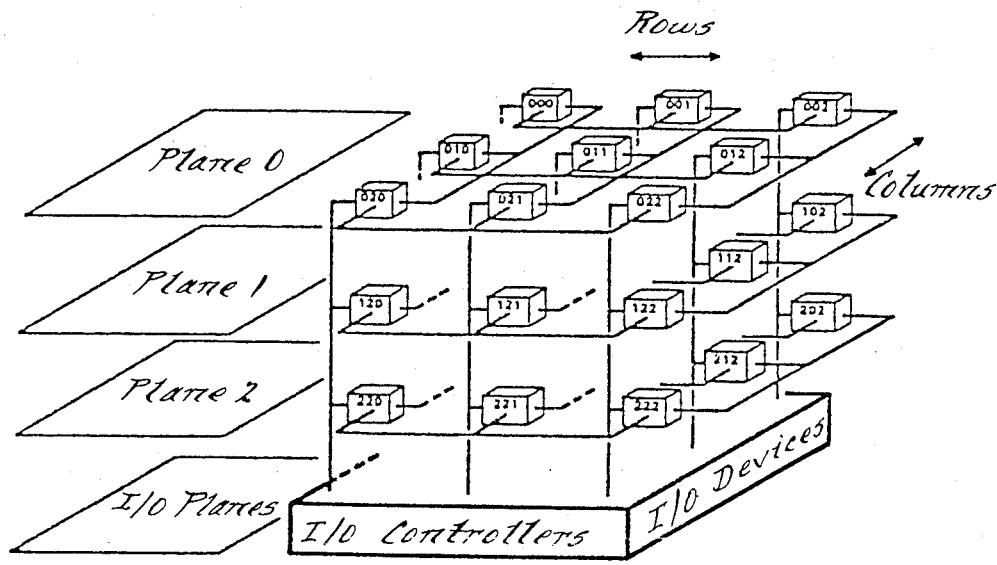
FIG. 16 is a schematic diagram of a bused cube configuration for connecting processing elements of a given level.

With this organization of the image understanding machine 10 of the present invention, various levels are available for processing data depending upon the granularity of the problem. In addition there is a parallel connection between each level to maximize communication rates between arrays of PEs. As noted above, communication between PEs within a level is satisfied by a nearest neighbor mesh at the CAAPP and ICP level with a 4×4×4 bused cube connection at the GPPA level. By "bused cube connection" it is meant that each GPPA PE is connected to three buses and each bus has up to four PEs. FIG. 16 illustrates a 3×3×3 bused cube configuration with each bus having up to three PEs. Implementation in this manner is straight forward because the machine of the present invention is based upon only two integrated circuit chip types: one for the combined CAAPP and ICP levels and one for the GPPA.

In the following Section B a description of a symbolic pixel array is provided which illustrates how the IU machine 10 of the present invention can be used both as a blackboard for reasoning about things (e.g., objects found in a scene), and as a tool for focus of attention processing. In Section C there is described in more detail the use of microcoded instruction queues which are introduced to minimize global bus traffic while ensuring that all processing levels are maximally active. These microcoded instruction queues permit the GPPA PEs to evoke a long series of machine instructions to the CAAPP and ICP level processors with as few as one "macro" instruction. Section D describes an improved dual-ported memory design for the CAAPP PEs which allows the CAAPP PEs to be used as a sort of intelligent memory residing in the physical system address space. This follows the controller (e.g., its associated GPPA PE) to access the memory of the CAAPP PE when it is busy processing data. The details and layouts of circuit components of the integrated circuit chip 22 are also described in Section D. Finally, Section E provides a specific example illustrating the operation of the IU machine 10 of the present invention.

B. Symbolic Pixel Array

The spatial blackboard plays an important role in the translation of raw imagery into discrete identified objects. It is capable of representing information at both the pixel level and the object level without loss of the relationship between scene objects and the pixels from which they originated. The symbolic pixel array is a data structure introduced to satisfy the need for this kind of blackboard representation (e.g., Payton, "A Symbolic Pixel Array for Representation of Spatial Knowledge," *Proceedings of the Third Annual International Phoenix Conference on Computers and Communications,* 1984). The symbolic pixel array makes use of separate representations for scalar properties and scene objects. Scalar properties such as intensities are represented by numeric arrays the size of the image. Scene objects are represented with binary masks, which identify where in the image each scene object is thought to exist.

One obvious disadvantage of using image size binary masks to represent each small object in an image is the potentially large memory that would be required. It has been suggested to replace the binary mask with a structure called a virtual array. This minimizes memory use by making use of the concept of an offset for each object. The binary mask uses only enough memory to hold the smallest possible binary array necessary to represent an object. However, the virtual array not only adds overhead, but also makes it difficult to control simultaneously multiple objects of the same class randomly distributed in the image using parallel processors.

Figure 4A:
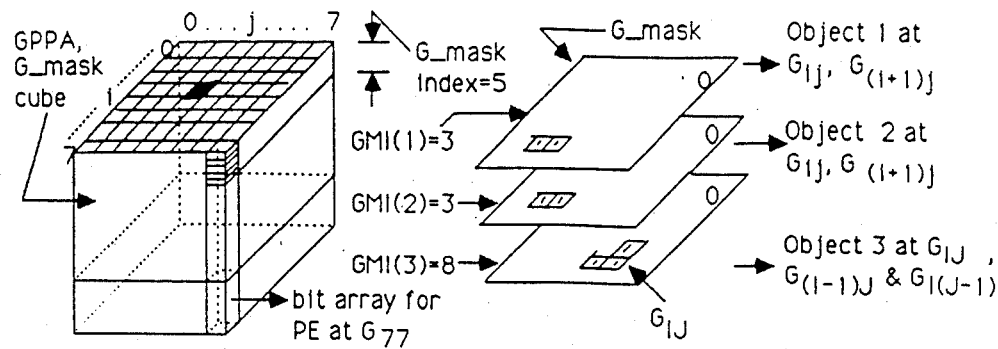
FIGS. 4(a-c) is a diagrammatic view helpful in understanding binary mask representations of objects in the machine of the present invention.
Figure 4B:
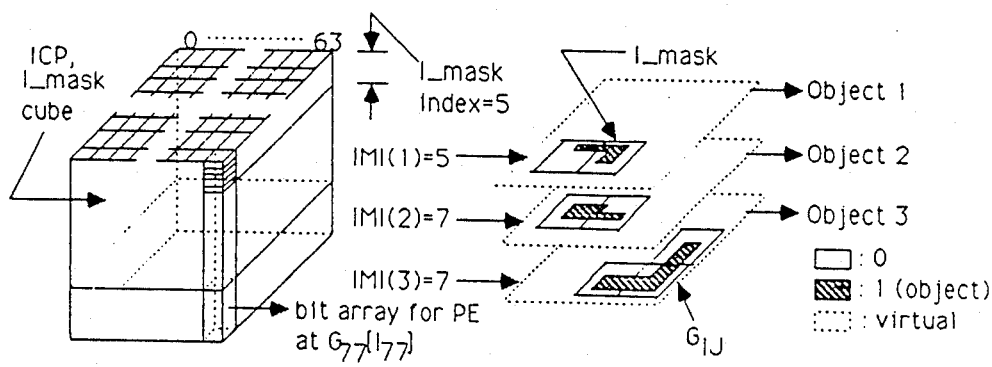
Figure 4C:
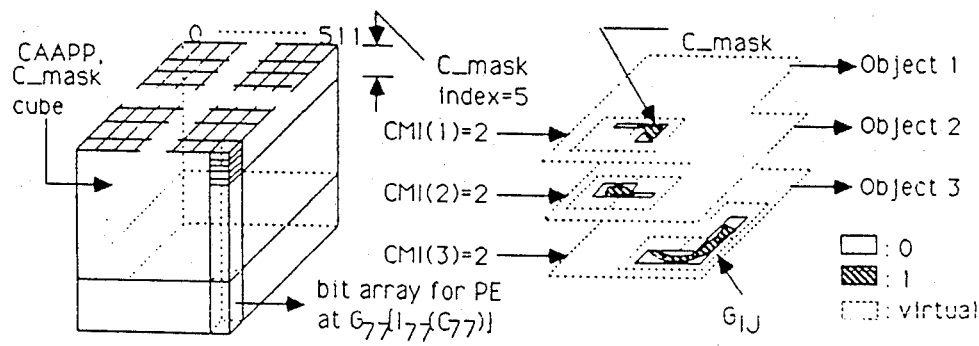

With the hierarchical architecture of the present invention, it is possible to replace the virtual array with a structure called Hierarchical Symbolic Pixel Array (HSPA). In HSPA, each object has three levels of binary mask representations. They are G_mask, I_mask, and C_mask, corresponding to processor levels at GPPA, ICP, and CAAPP, respectively. Each binary bit of the mask corresponds to one PE at that level. The content of the bit at any level is obtained by a "some/none" test to the 8×8 PEs on the level beneath it. A "some/none" test is the wired "OR" of the bit contents of the 8×8 PEs, i.e., if one or more of the PEs contain a logical 1, then the some/none test result will be a logical 1. A value of one indicates a portion of the object resides in the subimage (sector) corresponding to that PE. The bit position within a bit array for a given PE is called the mask index. The collection of these bit arrays is called the mask cube. (FIG. 4). For example, if the I_mask index (IMI) for an object A is equal to 3 (i.e., IMI(A)=3), then the corresponding binary mask of the ICP level representation resides somewhere in the third layer of the I_mask cube. In this embodiment, the layer sizes at GPPA, ICP, and CAAPP are 64, 4097 and 512×512 bits, respectively. The mask bit at each level controls the consumption of 8×8 bits of memory on the level beneath it (e.g. 1=consumption, 0=none). In other words, the smallest possible binary mask needed to represent an object at any level is always a multiple of 64 (i.e., 8×8). FIG. 4 illustrates the HSPA representations for three objects. Object 1 consumes the third layer of the G_mask cube (i.e., GMI(1)=3, mask size=64 bits). Since only two G_mask bits are set to 1 at Gij and G(i+1)j, (i.e. object 1 resides in subimage sectors corresponding to Gij, G(i+1)j), it occupies 128 (i.e. 2×64) bits at the fifth layer of the I_mask cube, with the number of bits being set in the I_mask equal to b1 (IMI(1)=5, I_mask size(1)=128 bits). Consequently, the mask at the CAAPP level has a size of 8×8×b1, and resides in the second layer of the C_mask cube (CMI(1)=2, C_mask size(1)=64b1). Usually, the three mask indices are different for an object.

Object 2 has the same G_mask as Object 1 (i.e., GMI(1)=GMI(2)); therefore, it is possible to accommodate more objects than the number of layers in the G_mask cube. As a result, the I_mask of object 2 must occupy a different cube layer from that of Object 1. It may reside in the same layer as that of Object 3 because their G_masks are non-overlapping. Similarly, the C_masks of all three objects may occupy the same mask layer, based on the non-overlapping of their corresponding I_masks (e.g. CMI(1)=CMI(2)=CMI(3)=2, as shown in FIG. 4).

Two objects A & B may have overlapping C_masks since some pixels can belong to two different hypotheses associated with Objects A & B. In this case, their CMIs have to be different. Therefore, the mask cubes enable individual pixels to hold multiple hypotheses.

In addition to the conventional row column addressing mode, the board/chip select can be controlled by the G_mask/I_mask using separate decoding hardware (value of mask bit: 1=select, 0=disabled). This facilitates focus of attention processing. For example, to process Object 3 (e.g., runway) only, the controller will specify G_mask and I_mask indices (GMI(3) & IMI(3)) in the address bus, and send CAAPP a command through the data bus, which will load the CAAPP activity bit (A register) with C_mask. Any subsequent CAAPP instructions will only affect Object 3. In summary, any object can be uniquely accessed/processed by specifying its corresponding three mask indices.

To control simultaneously multiple objects of the same class dispersed in the image, the HSPA can be easily created to represent the union of them. The HSPA of the union can then be treated as a single entity as far as the controller is concerned, without destroying the original identities of the individual objects.

C. Microcoded Instruction Queues

One obvious disadvantage of using the above SIMD (Which stands for single instruction multiple data) CAAPP architecture is the potentially large waste of inactive processor arrays. At worse, most objects will cross the physical board/chip boundaries, causing difficulties in synchronizing the multiple local controllers for concurrently processing different objects (e.g., one set of PEs processing a runway while another set processes buildings). With the previous CAAPP architecture, if several objects touch the subimage sector of a given board (GPPA PE), they would all have to be sequentially processed. Thus, CAAPP processing efficiency would be decreased. At every clock cycle, the GPPA PE could issue only one command to PEs associated with just one object. As a result, other AAPP PEs associated with other objects have to be idled. Fortunately, it is possible to take advantage or the fact that CAAPP is a bit-serial machine and most image processing routines require byte or word parallel operation. This is done by using instruction queues with microcoding to mimic a MIMD (which stands for multiple instruction multiple data) architecture instead of a bit-serial operation.

The idea of instruction queues with microcoding is to have different objects or sets of PEs which receive in turn small sets of byte or word instructions from the local controller sequentially, but which internally expand concurrently the assembly level word instruction into several microcode level bit-serial instructions. For example, one assembly level instruction from the local controller for multiplication of two words will keep an object, i.e., the corresponding CAAPP array, busy for at least 256 clock cycles by executing 256 bit-serial operations. This way, the local controller is able to take advantage of the microcoded routines within an object, i.e., on-chip microprograms, by issuing several other assembly level instructions to PEs associated with other objects. Therefore, all the objects within a board are maximally active.

To support this kind of virtual MIMD architecture, a board/chip select controlled by the G_mask and I_mask of HSPA is provided. Instead of enabling or disabling activities of the PE array, the board/chip select is used to control whether or not to load the current assembly instruction from the data bus into the object.(i.e., the corresponding PEs) instruction queues. Nevertheless, the enable/disable of the processor array can still be done implicitly through the status of the instruction queue. If the queue is empty, the PEs are idle and thus disabled; they are enabled through loading the instructions into the queue on the ICP/CAAPP chip. By specifying a unique set of HSPA mask indices, the instruction queue of every object can be loaded in turn with a different set of programs. Therefore, virtual MIMD operation can be achieved Since each object cannot fetch its own instruction by using a program counter, it is not a true MIMD architecture in the conventional sense.

It should be noted that the combined features of HSPA and microcoded instruction queues make the physical board/chip boundaries invisible to the object processing routine. In other words, the scene object can assume any shape and size without concern over local controller synchronization. Thus, the G_mask controls the synchronization of GPPA PEs, and the L_mask controls the loading of instruction queues at each object chip. Finally, microcoded queues ensure that all object processors are running concurrently with different programs. Therefore, original local controller performance can be improved by a factor of n, if n objects touch the sector corresponding to that local controller. Furthermore, if one small object touches four adjacent local controllers (GPPA PEs), it will not tie down the running of 4n object programs; instead it requires only one unit of time slice. Thus, if on average ten objects touch a given GPPA board, then the ideal system performance can be improved by a factor of 40.

Time slicing plays an important role in synchronizing various local controllers within an object. If two objects A & B have overlapping G_masks, then their time slice indices (TSI) have to be different. Assume every time frame has ten clock cycles, and $TSI(A)=1$, $TSI(B)=10$. Then, at the first clock cycle of every time frame, all the local controllers associated with Object A will issue one instruction to the corresponding portion of Object A if the queue is not full. Object B will receive instruction at the tenth (last) clock cycle. If Objects A & B have non-overlapping G_masks, then they can have the same TSI. For objects crossing board (GPPA PE) boundaries, time slicing ensures that all portions of an object receive the same instruction at the same time. Suitable hardware can be used to dynamically select the TSI for each object at run time.

Time slicing also resolves the contentions among multiple objects having the same G-masks for global resources such as response counts and some/none tests. In the currently preferred embodiment, two queues are assigned for each time slice index at the GPPA level; while the some/none test result will determine which queue will be active.

Histogramming techniques are used extensively by modern segmentation algorithms (see, e.g., Reynolds, Irwin, Hanson and Riseman, "Hierarchical Knowledge-directed Object Extraction Using a Combined Region and Line Representation," *Proceedings of Image Understanding Workshop*, 1984). The scarcity of HOST level global response count resources could be a serious bottleneck. A known CAAPP had only one HOST level global adder tree, which accumulated all response counts from 64 boards (GPPA PEs), and one SOME/NONE test circuit. Ideally, the number of HOST level global Response Count and Some/None (HRCSN) circuits should be equal to the number of layers in the G_mask cube. Instead of driving one HRCSN circuit, the response counts from every GPPA board will drive multiple circuits. Thus, objects having different G_masks may perform histogram operations concurrently. The GMI determines which HRCSN circuit will be used for a given object. All the HRCSN circuits and its 64 inputs are the same. However, their counting results are different and based on the corresponding G_mask to determine the subset of boards whose response counts will be accumulated by the circuit (mask bit: 1=accumulate, 0=none). Since not all the objects will perform the histogramming at the same time, the number of HRCSN circuits can be smaller than the number of G_mask layers. The optimal number can be determined by simulation. The Response Count Index (RCI) is used to determine which HRCSN circuit will be allocated to a given object. In summary, to successfully process a given object, five indices are required; there are three HSPA mask indices, a time slice index and a response count index.

The addition of instruction queues and microprogram storage does not cost a lot in terms of system complexity or size (e.g. on chip real estate).

D. ICP/CAAP Integraged Circuit Chip

Design with Dual-Ported Memory

To ensure that all processors are actively processing data, data must be ready when needed. The present invention provides multiple dual-ported memory banks to allow CAAPP to work on one set of data in one memory bank, while local controllers are loading the next set of data to be processed into another memory bank. When the current bank is finished processing, a switch can make it accessible by the local controller. Therefore, a sufficient number of pins for address bus have been added to the ICP/CAAPP chip design to support use of ICP/CAAPP PEs as intelligent memories, residing in the physical system address space. This addition is also needed to support the HSPA scheme of chip select by specifying mask indices on the address bus. As a bonus, the microprogram storage for ICP/CAAPP PEs and control functions other than HSPA mask indices can also be accessed through the system address space. The CAAPP instruction format has 32 pins and occupies the system 32-bit data bus.

Figure 5:
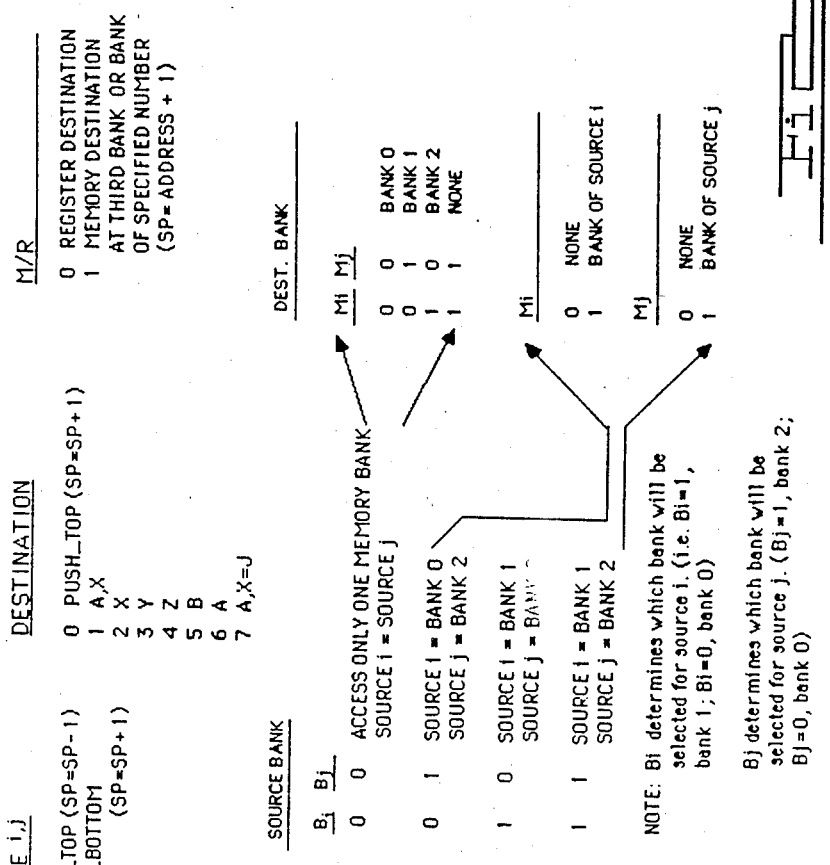
FIG. 5 is a schematic illustration of a micro-instruction set for the first level processing elements.

In the course of mapping large window convolution algorithms onto the HIUM, it was determined that three memory banks for each CAAPP PE are sufficient. Furthermore, if each memory bank has its own address register with up/down counter capability, then it can also be regarded as an operand stack and increase immediately the CAAPP PE performance by a factor of 3. The address register can be treated as a stack pointer. Usually, image processing operation calls for two operands from the memory and saves the results in a third memory position. It takes one of the known CAAPP three instructions to access three different memory locations due to the constraint of the size of the address field in instruction format, which can only specify one memory bit location. With the new operand stacks, the two operand bits can be simply popped off the stacks, and the result can be saved onto the third bank at a bit location specified by the address field of the CAAPP instruction. It takes only one instruction to do this for all but the first bit of byte/word operands, and thus achieves three times performance improvement. The first bit of the word, however, still requires three instructions to compute such that the stack pointers/address registers can be initialized as a side effect. FIG. 5 shows a preferred instruction format. The CAAPP assembler will take care of how to optimally assign various variables to appropriate banks so that operands and result reside in different banks as much as possible and free programmers of the chores.

Figure 13:
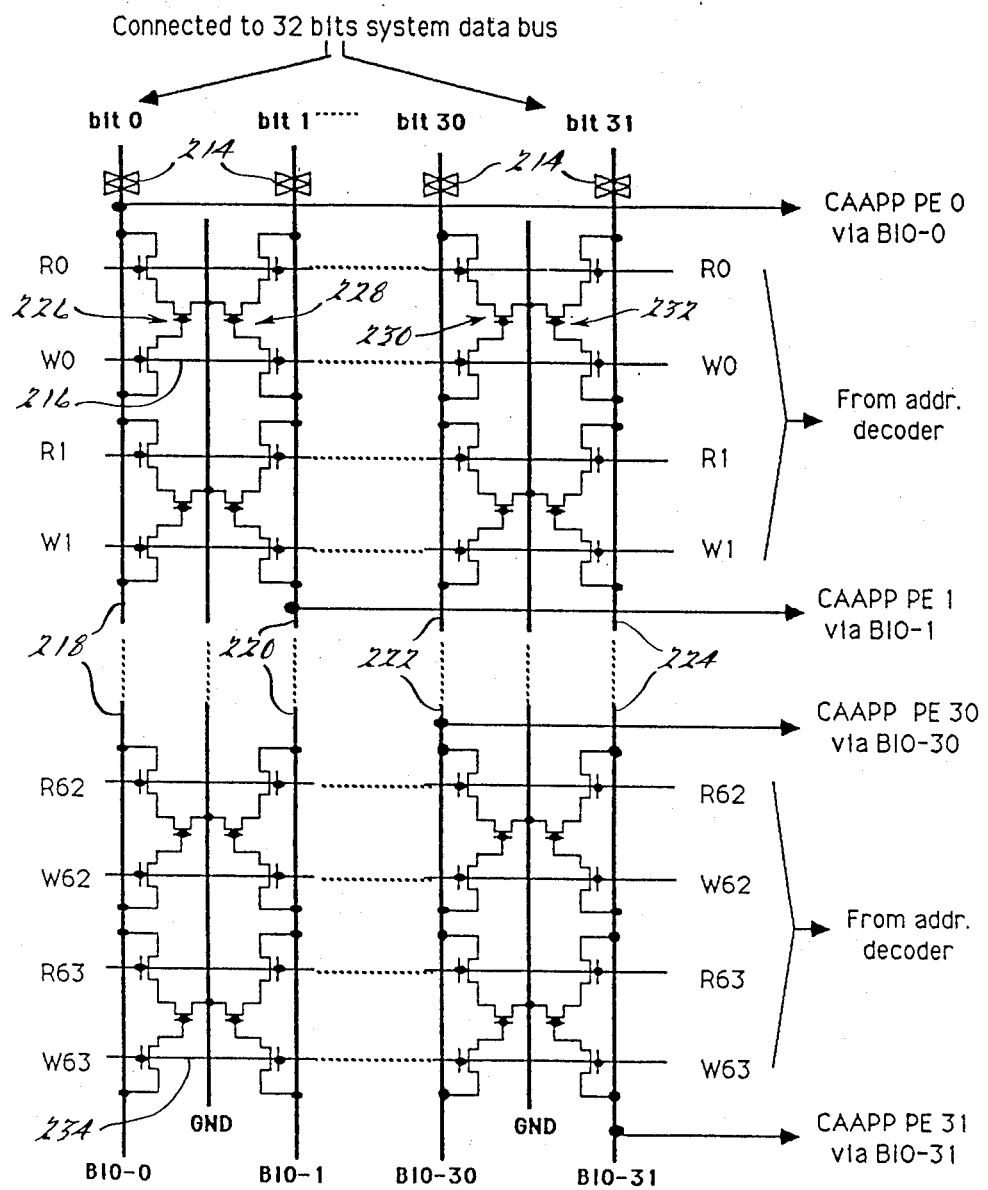
FIG. 13 is a schematic circuit diagram of a dual-ported memory layout for a first level processing element.
Figure 14:
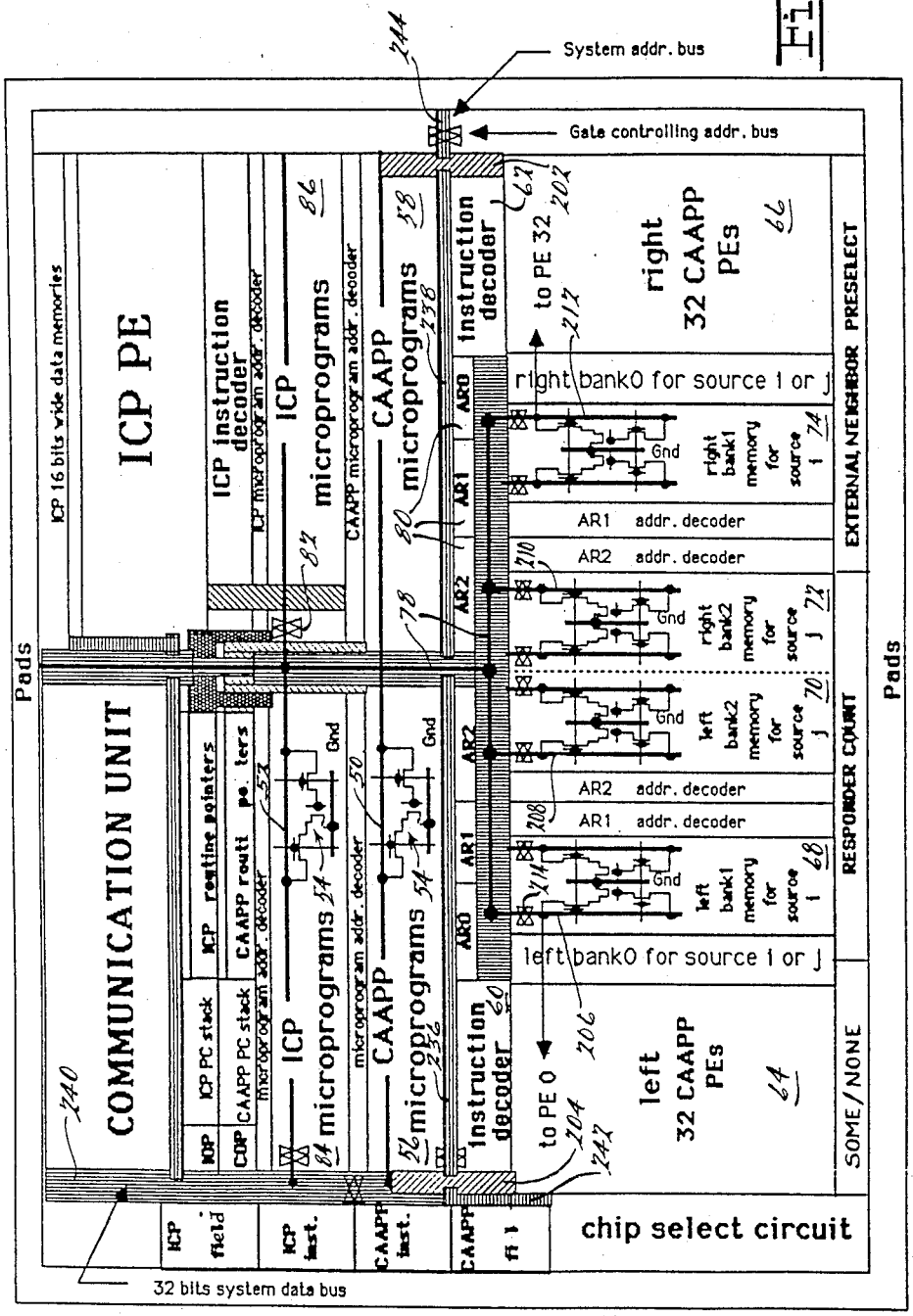
FIG. 14 is a diagrammatic view illustrating an integrated circuit chip design layout for a combination of first and second level processing elements.

With particular attention to FIGS. 13-14, the design of the present invention concentrates on supporting the new features of HIUM but does not cost a lot in terms of system complexity or size. Careful attention is paid to the required on-chip real estate used and the regularity of layout. The major savings are achieved by the multiple uses of BIO (input/output bus) lines (e.g., 50,52 in FIG. 14) of three-transistor RAM (random access memory) cells generally designated by the numeral 54. Thus, each cell is capable of storing a binary value. The BIO lines 50 serve both as the output line for CAAPP microroutines from store 56,58 and as the interconnection via 202, 204 between two instruction decoders 60,62 of two 32 CAAPP PE stacks 64,66 on two extreme sides of the chip. The ICP microprogram storage RAM's BIO lines 52 have three purposes. These function as part of the memory structure, output lines of ICP microroutines, and as a data bus for access by HOST/GPPA/ICP of CAAPP PE memories. The BIO lines of CAAPP memory banks 1 & 2 are used both by CAAPP PEs and higher level PEs.

FIG. 13 shows the schematic for the dual-ported memory bank which corresponds to banks 68,70,72, and 74 in FIG. 14. When the gates 214 are turned on, the BIO lines can be used by the GPPA/ICP to access one bit from each CAAPP PE. For example, if write line WO 216 is active, then BIO line 218 is used for writing into the bit 0 RAM cell 226 of CAAPP PE 0. Similarly, bit 0 RAM cell 228 of PE 1, cell 230 of PE 30 and cell 232 of PE 31 will use BIO lines 220, 222, and 224, respectively. To update the bit 63 RAM cells of all CAAPP PEs, the write line W63 234 will be activated. BIO line 218 corresponds to BIO lines 206 and 208 in FIG. 14, and is connected, as shown, to the bit 0 of system data bus 240 via line 52 and 78 or to the CAAPP PE O. However, if the gates 214 are turned off, the memory bank will be disconnected from the system data bus. As a result, the BIO lines can be used by the CAAPP PE to access one bit from the memory bank. The address registers 80 for each bank can be loaded from the on-chip address bus 236, 238 which is connected to either the system data bus 240 via the address field 242 of the CAAPP instruction or directly to the system address bus 244, such that the memory bank can reside in physical address space. To facilitate flexibility for the system to access one word from a given PE, or one bit from each PE, data cache is included in each GPPA PE board for data format transformation. The block transfer size is equal to 32 words, and access of the current block will automatically initiate the next block transfer so that when the system has finished accessing the current block, the next block date will be ready to be accessed. The sequence of the next block is under software control, and can be stored in the control registers of the data cache.

Figure 15:
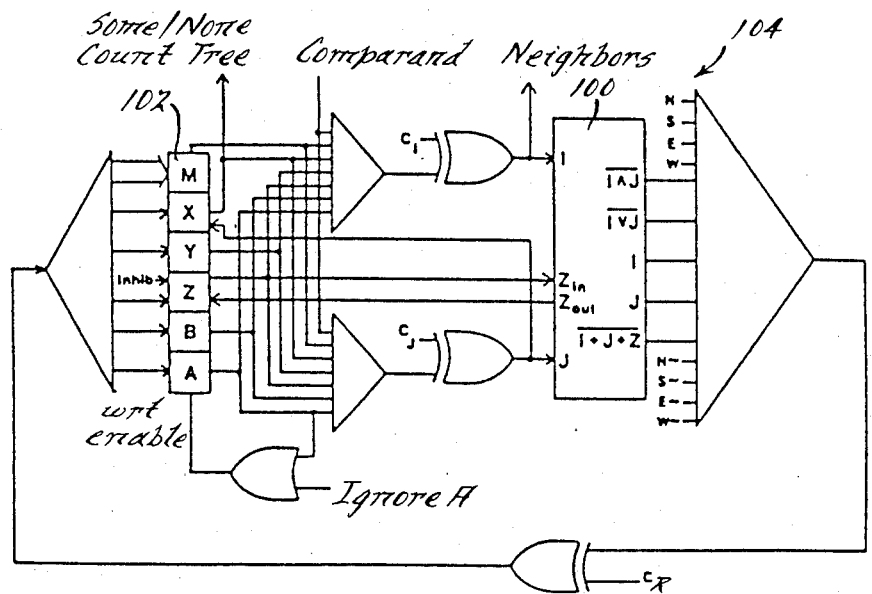
FIG. 15 is a schematic diagram of a suitable first level processing element that can be used in the architecture of the present invention.

The floor plan for the chip is shown in FIG. 14. As can be seen here, the BIO lines 50 of CAAPP microprograms will interconnect two instruction decoders 60,62. The BIO lines 52 of ICP microprograms store 84 will connect the BIO lines 206, 208, 210 and 212 of bank 1 and bank 2 of the CAAPP PE stacks via line 78 and thus make them accessible by the out-chip command; it also allows an on-chip ICP PE to access those banks under the control of separate ICP microprogram store 86 when the gate 82 is turned off. A functional diagram of a suitable CAAPP PE is shown in FIG. 15. The details of the circuitry for this PE is disclosed in more detail in the paper by Levitan et al., "Signal to Symbols: Unblocking the Vision Communications/Control Bottleneck", VLSI Signal Processing published 1984 by IEEE PRESS. Briefly, each CAAPP PE ;is a bit-serial processor consisting of a bit-serial arithmetic logic unit (ALU) 100, a memory section generally designated by the numeral 102 which can correspond with the memory banks described above in connection with the chip layout. Various local and global interconnection hardware is provided, the global interconnection being represented by the north, south, east and west mesh interconnections bearing reference numeral 104. Several single bit registers are provided. Register X is a primary accumulator bit which is also used for communications. Register Y stores a second accumulator bit. Register Z stores the carry bit which is used for arithmetic operations. Register A can be used to store an activity bit which can be employed for enabling and disabling this particular PE on any given operation. Register B is used as a secondary activity bit for temporary storage of activity "flags".

E. Specific Example of Machine Operation

In this section, it is shown how an expert system for object recognition in natural scenes is mapped onto the HIUM see, e.g., Lawton, Levitan, Weems, Riseman, Hanson, "Iconic to Symbolic Processing Using a Content Addressable Array Parallel Processor," *Proceedings of Image Understanding Workshop,* 1984). We start with the initial set of regions produced by general segmentation algorithms disclosed, for example, in the articles noted above which are hereby incorporated by reference. Unconditionally, each region is initially classified as a scene object which is the most generic object class that subsumes all object classes in the image domain. Note that the classification of a region as a scene object does not involve any ambiguities or uncertainties. As the inference process proceeds, each object is hypothesized as each of its subclasses, and evidence is gathered to confirm or refuse these hypotheses. The split/merge operation may also be performed by using the semantically directed feedback for resegmentation. This cycle of hypothesis generation, evidence gathering, and confirmation or refutation is repeated for each confirmed hypothesis until each region is classified as a terminal object class of the object hierarchy, or no further subclassification is possible because of low confidence for the current classification.

In the end, the symbolic description of the entire scene is constructed and stored in the ICP/CAAPP PE memories in the form of a semantic network with each node represented by one or more instance frames. These memories are referred to as SHORT-TERM MEMORIES (STM). The scalar properties and binary masked scene objects are stored in the CAAPP memories. The instance of an object frame and its associated slot values, super/subclass and member/component relationship pointers are stored in the ICP memories. The HOST/GPPA memories are referred to as LONG-TERM MEMORIES (LTM). Various kinds of knowledge, such as contextual, domain specific, and picture specific knowledge are stored in the LTM. There are two roles played by GPPA PEs: local controller for ICP/CAAPP, and domain "expert" for a particular set of objects. As a local controller, GPPA stores primitive image operation routines such as convolution, histogramming., and so on for the CAAPP and primitive rule matching routines for ICP. The HOST will store complex image processing routines in terms of GPPA primitive operations if the GPPA is constrained by memory size. As a domain expert, GPPA will be equipped with object models, knowing its stable states and the most likely segmentation strategy, etc.; it also performs housekeeping for sets of objects of the same class, as will be seen in the following example.

Figure 6:
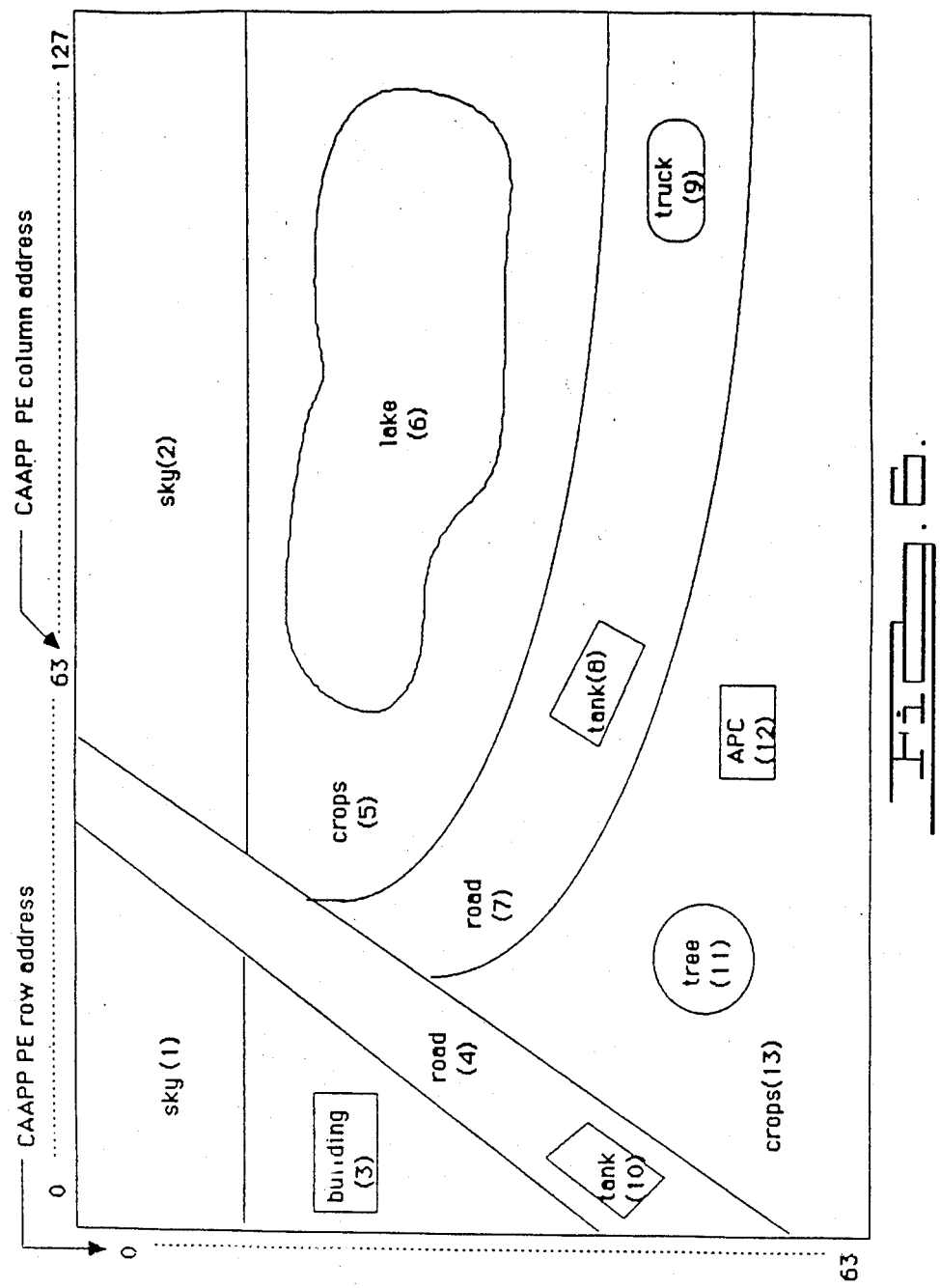
FIGS. 6-7, 8(a-b) and 9-12 are diagrammatic illustrations useful in understanding an example of a method of using the machine of the present invention.
Figure 7:
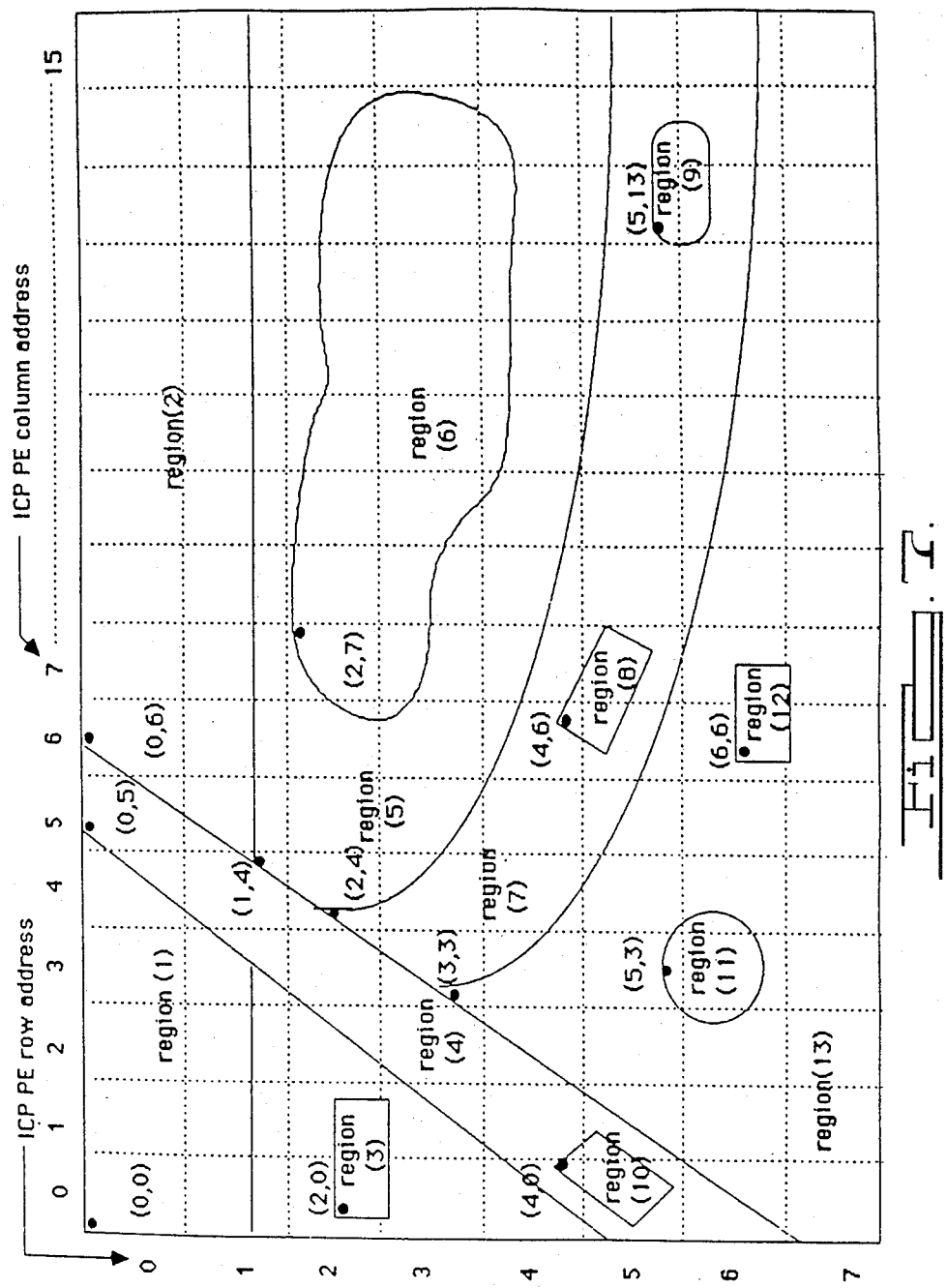

Using the hypothetical scene in FIG. 6, the initial general region segmentation result would be as shown in FIG. 7. For the sake of simplicity, it is assumed that the image size is 64×128 and occupies two GPPA boards at (0,0) and (0,1). The row and column address ranges for ICP and CAAPP are (0-7, 0-15) and (0-63, 0-127), respectively. To extract connected components, the coordinates of the cells in the region can be used to determine the component labels (see, e.g., D. Lawton, S. Levitan, C. Weems, E. Riseman, A. Hanson, "Iconic to Symbolic Processing Using a Content Addressable Array Parallel Processor," *Proceedings of Image Understanding Workshop*, October 1984, P316–332). Collisions between adjacent cells having the same region properties are resolved by letting the one with the least row,-col coordinate be the dominant region label. The particular region cell having the least row,col component is called the dominant region cell. In HIUM, the ICP PE corresponding to this dominant CAAPP cell is where the instance frame, which contains various attributes of this scene object, is stored. FIG. 7 shows the coordinates of those ICP PEs which contain the instance frame with empty slots. To fill these slots, it is suggested to step sequentially through each extracted scene object using the Find First Responder operation of the CAAPP. By broadcasting the region label, it is straightforward to compute simple region properties such as area, perimeter length, minimum bounding rectangle, and so forth for the corresponding region. The HSPA representations for an object are also generated at this stage by latching the some/none test results at each appropriate level. The corresponding HSPA mask indices are stored in the slots of individual instance frames as part of attribute lists.

Figure 8A:
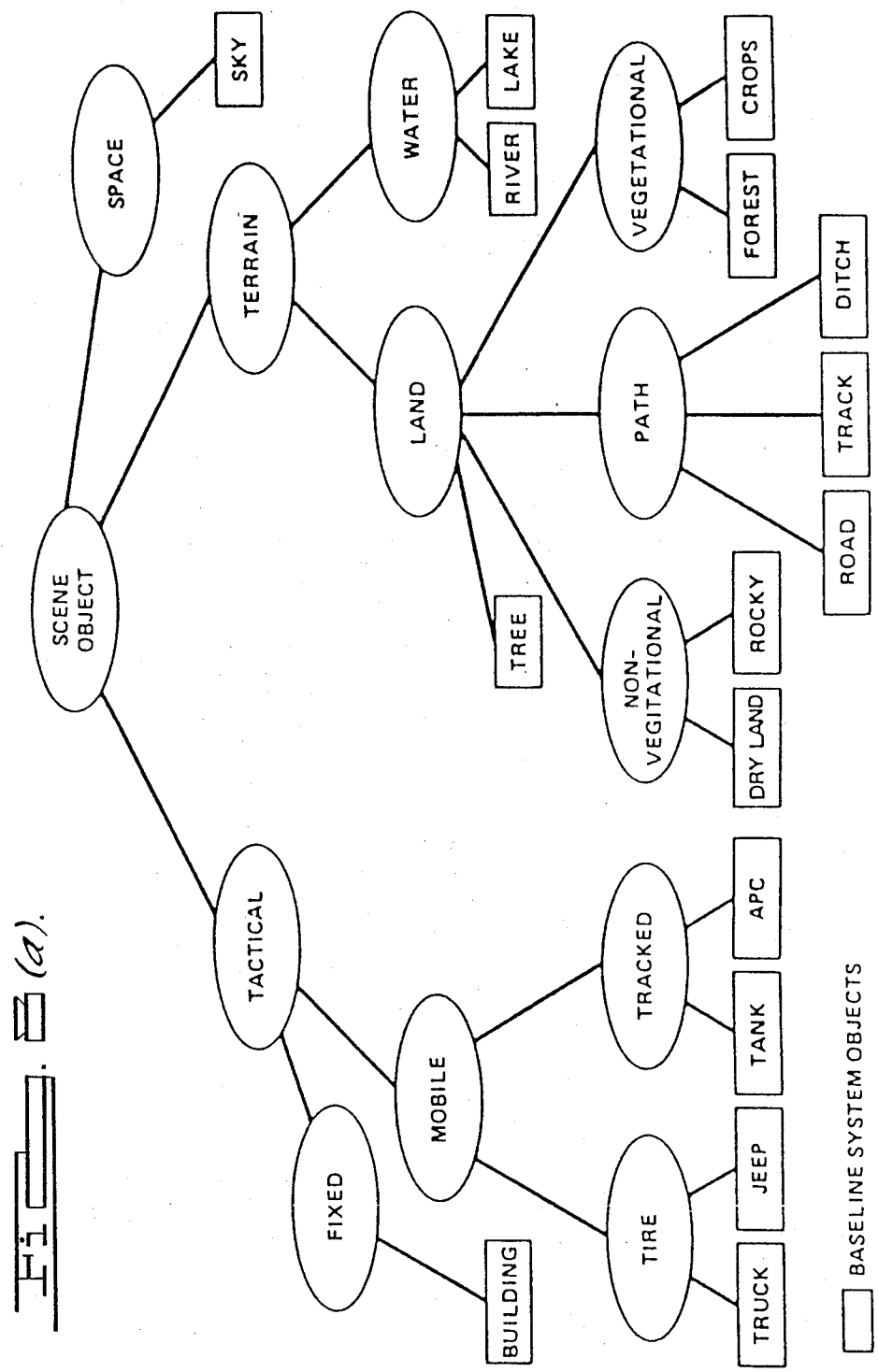

As the inference process proceeds, the "established" objects will attempt to generate hypotheses to subclassify themselves into more specific classes based on the object hierarchy shown in FIG. 8(a). In this hierarchy, the scene object is automatically assumed "established"; therefore, its three subclassification hypotheses, tactical, terrain and space, are generated accordingly. To achieve efficiency, we may proceed with two computational steps. In the first step, hypotheses are filtered by computationally simple tests. Highly unlikely hypotheses are quickly eliminated by simple binary, true/false, tests. Only the hypotheses that pass this screening test will receive further evaluation. In the second step, each piece of evidence is carefully weighed, integrated into the existing body of evidence, and confidence is updated.

Consider the first computational step in HIUM. FIG. 9 shows that each of the 13 scene object frames, before the screening test, contains three NIL pointers corresponding to three hypotheses generated: tact (tactical), terr (terrain), and space. FIG. 10 shows that after a screening test for tactical objects, five tactical hypotheses are successfully instantiated, as indicated by the values stored in the "tact" pointer slots which point to the corresponding empty tactical object instance frames residing in the neighboring physical ICP PEs. The "tact" pointer slots of other scene objects will remain NIL to manifest the fact that even though the hypotheses are generated but not instantiated, through reserving ICP PEs for storage due to failure of the screening test. For example, at the upper left corner in FIG. 10, the "tact" pointer of Scene Object 3 contains (2,1) and points to instance frame which has the identification of "tactical-3" at the neighboring ICP PE (2,1). Note that Scene Object 3, which is a building in FIG. 6, relates to Region 3 in FIG. 7. Even though only the forward pointer is shown, all the links in the object hierarchy are doubly linked. For the sake of simplicity, only objects which touch the board (0,0) will be shown in the figures.

There are two ways to obtain the new pointer for reserving an empty instance frame. The first is through the HOST/GPPA which may perform garbage collection and maintain free storage lists. This approach is most effective when the ICP array is highly populated. The second method is through message waves sent concurrently/locally by all objects passing the screen test. This approach is very efficient when most of the neighboring ICP PEs are free. To see how the first approach works, consider the previous five tactical hypotheses. At the beginning, the HOST, (or a GPPA PE when acting as a domain expert at the lower levels of the object hierarchy, by sending the command through HOST), sent screening tests to all 13 scene objects, only five of which passed. The HOST steps through each of them using the Find First Responder operation, and delivers one pointer extracted from the free storage list to the corresponding "tact" pointer slot. Before proceeding to the second computational step, the HOST will filter all 13 objects by terrain and space screening tests in case multiple hypotheses for an object are necessary.

To establish an instantiated hypothesis, evidence should be gathered and weighed in the second computational step. In addition to delivering empty frame pointers to five potential tactical objects, the HOST will gather the corresponding HSPA mask indices and represent the union of them. This information will be passed to the appropriate domain expert to control all five objects simultaneously if possible.

Assuming HOST, GPPA PE(0,0), and GPPA PE(0,1) are experts on space, terrain, and tactical, respectively, then GPPA PE(0,0) will receive relevant information about four instantiated terrain hypotheses and supervise the execution of image processing routines on four dispersed objects (i.e., the corresponding CAAPP PEs), through HOST by sending routine pointers. The operations performed on tactical and terrain objects can be concurrent if their HSPA masks are non-overlapping. Unfortunately, in FIG. 10 Scene Object 11 (tree) is instantiated both as a tactical and a terrain object as can be seen by the non NIL pointers. By performing set difference operations on HSPA masks, GPPA PE (0,1) will be able to initiate activity on the other four tactical objects while doing the housekeeping chores for Object 11 and waiting for its resources to be free. With just one object, there is a better chance to find non-overlapping HSPA masks next time around. When the image processing on the four tactical objects is finished the results can be sent, using the scene object pointer, to the destination slot in the tactical instance frame, or further down the hierarchy as more subclassification is instantiated. All four objects can do this concurrently or pipelined, depending on the availability of concurrently or pipelined, depending on the availability of global resources, to obtain the result. Since the processing routines for terrain and tactical objects are different, their results will be sent at different times. Consequently, there is less chance for contention for the ICP packet switching resource. It should be noted that HSPA mask indices are the bridge between the nonspatial symbolic representation of instance frames, which are linked through pointers, and the spatial scene objects where the physical location and image scalar properties are important for image processing.

To gather evidence for a given hypothesis, in part, there are two slots: ded (deductive) and ind (inductive) in the tactical instance frame in FIG. 10, which store results of the deductive and inductive reasoning about context. In the corresponding slots in the model frame, the domain expert stores pointers to the deductive and inductive reasoning procedures in the HOST. FIG. 8(b) shows a road model and its corresponding deductive and inductive reasoning methods. It is referred to as model-driven reasoning, since these procedures may all be defined relative to the model itself; they may be tuned specifically to operate over a defined domain. After all the slots for a given instance frame are filled if possible, the confidence will be weighed by ICP/GPPA according to some rules. If the confidence score is low, the hypothesis will be discarded and the corresponding ICP PE storage space for the instance frame will be returned to the free storage space for the instance frame will be returned to the free storage list. The pointer slot of its superclass will be NILed. If the confidence score is high enough, then the instantiated hypothesis will be established. A new cycle of subclassification hypothesis will be generated. This is referred to as data-driven reasoning, due to new hypotheses being generated through evidence gathering. The ICP will perform complex symbolic processing, except when floating point operations are required for the computing confidence score. Since the ICP can access CAAPP memory, the CAAPP PE can be treated as a content addressable memory for the ICP when image processing operations are idling.

After a few cycles of hypothesis generation, Scene Object 10 at the middle left corner in FIG. failed to be classified as a tactical object (tank in this case). Just as human beings would refuse to classify an object into a specific class unless sufficient information were available, the last instance frame of mobile-10 says "That is definitely a moving object but I don't know whether it is a tank or truck." (Pointers for "tire" and "tracked" are NIL, meaning insufficient evidence for any further subclassification.) In other words, the sentence has a physical correspondence in the STM of ICP.

In part, the fact that mobile-10 is a moving object is strongly supported by the evidence that it has a wheel, as indicated by the value (5,2) in the "ded" pointer slot, which points to "wheel-14" instance frame at ICP PE (5,2), and was obtained through a deductive reasoning method as follows. The wheel hypothesis is first generated and the CAAPP image routine of "wheel finder" is then invoked. Since the routine is defined relative to the vehicle itself, it has been tuned to much higher sensitivity levels because of the reduced amount of misleading clutter within the domain of Object 10. The attributes list, including HSPA mask indices, of the newly segmented Region 14 is gathered and stored in the scene object instance frame at ICP PE (6,1). After passing the screening test for wheels, the hypothesis is instantiated by storing (5,2) in the "wheel" pointer slot of Scene Obj-14. The "wheel-14" instance frame is established by further processing. For example, based on the orientation of Mobile-10, the projection of the modeled wheel can be compared with the observed wheel. The pointer to the established wheel instance is returned to the "ded" pointer slot of Mobile-10 along with the confidence score of the wheel. Therefore, Mobile-10 can know its wheel location by retrieving HSPA mask indices through the pointer threads. In the end, the confidence score of Mobile-10 is further increased by the fact that it is on Road-4 as indicated by the "ind" pointer slot which has a value of (2,3) and points to Road-4 instance frame at ICP PE (2,3). (FIG. 6, FIG. 12) Consequently, object-10 is definitely a moving object.

Scen Object 12 at the lower right corner in FIG. 11, is successfully classified as APC with appropriate pointer threads. If it is desired to find an APC in an image, simply broadcast "APC" to the ICP array, and ICP PE (7,3) will initiate backward tracing and reach the scene object instance frame at ICP PE (6,6). The HSPA mask indices (i.e., object physical location) will be retrieved along the way with other pertinent information required. It also contains multiple hypotheses for this object. FIG. 12 shows full semantic network representation for the scene. If tactical objects are of interest, all the corresponding ICP PEs will flag and retrieve physical locations. If closest tanks are of interest, all the tanks will initiate image processing, and the one closest to certain pixels will flag. This is possible due to the bridge role of HSPA between nonspatial and spatial information.

The various advantages of the present invention will become apparent to one skilled in the art after a study of the drawings, specification and following claims.

What is claimed is:

1. A computer architecture for an image understanding machine for performing operations on image data in the form of a matrix of pixels, said machine comprising:
   a first level of image processing elements having a first construction that enables neighboring processing elements on the first level to operate on different instructions simultaneously;
   a second level of processing elements having a different construction than the first level processing elements, said second level processing elements each including means therein enabling processing elements on the second level to operate on different instructions simultaneously, each second level processing element being associated with a group of first level processing elements and communicating therewith as well as with other second level processing elements;
   a third level of processing elements having a construction different than the first and second level of processing elements, each third level processing element being associated with a given number of second level processing elements and communicating therewith as well as with other third level processing elements; and
   a host computer communicating with at least the third level processing elements whereby different instructions can be transmitted to the processing elements of various levels to enable the computer to operate simultaneously on multiple instructions in each level.

2. The machine of claim 1 wherein the system is constructed on a plurality of circuit boards communicating with the host computer, each board containing:
   at least one third level processing element;
   a first plurality of second processing elements
   a second larger plurality of first processing elements; and
   connector means on the circuit board for establishing communication between at least the third level processing element on the board and the host computer through a bus.

3. The machine of claim 2 wherein said bus includes a backplane into which the connectors of the circuit boards are inserted, with the backplane being used as part of a global bus between the third level processors on the individual circuit boards and the host computer.

4. The machine of claim 2 wherein said first plurality of second level processing elements is an N×N array, where N is greater than 1; and wherein said second plurality of first processing elements is an mN×mN array, where m is greater than 1.

5. The machine of claim 4 wherein m equals 8.

6. The machine of claim 1 wherein said first level processing element includes a bit-serial arithmetic logic unit communicating with a random access memory and means for mesh connecting each processing element to its neighboring processing elements of the first level.

7. The machine of claim 1 wherein said second level processing elements each comprise a multi-bit parallel processor.

8. The machine of claim 1 wherein said third level processing elements each comprise a general purpose microprocessor.

9. The machine of claim 1 wherein, an array of first level processing elements is fabricated together with one second level processing element on a single integrated circuit chip.

10. The machine of claim 9 wherein said chip includes at least one dual ported memory bank having input/output lines connected both to the first level processing elements and to processing elements of at least one other level.

11. The machine of claim 10 wherein said memory bank includes a plurality of cells, each cell containing at least one transistor defining a random access memory.

12. The machine of claim 10 wherein said chip includes first microprogram store means for storing instructions and a first decoder for decoding the instructions for controlling the operation of selected first level processing elements, second microprogram store means for storing different instructions and a second decoder for decoding the different instructions for controlling the operation of the second level processing elements, and wherein the input/output lines of the memory bank are connected to said microprogram store as well as to said first level processing elements.

13. The machine of claim 9 wherein one second level processing element is located on said chip together with means on the chip connecting said second level processing element to an array of 64 first level processing elements.

14. The machine of claim 1 wherein the host communicates with each third level processing element by way of a backplane, each third level processing element communicates with its associated second level processing element by way of a bus provided on a circuit board, and wherein each second level processing element communicates with its associated group of first level processing elements by way of a bus provided on an integrated circuit chip.

15. A method of analyzing an image represented by a matrix of pixels, said method comprising:
   loading the pixels into an image understanding machine having first, second and third levels of processing elements in which processing elements in each level have different constructions;
   simultaneously performing different operations on selected groups of the pixels with the first level processing elements, there being one first level processing element for each pixel in the matrix;
   using the second level processing elements to simultaneously perform other operations on a group of pixels associated with an array of first level processing elements; and
   using the third level processing elements to instruct the first and second level processing elements.

16. The method of claim 15 which further comprises:
   providing parallel connections between processing elements of each level to thereby maximize communication rates therebetween.

17. The method of claim 16 wherein parallel connection between said first level processing elements is provided by a nearest neighbor mesh, wherein the connection for the second level processing elements is provided by a nearest neighbor mesh, and wherein parallel connections between the third level processing elements is provided by a bused cube connection.

18. The method of claim 17 which further comprises:
   establishing communication between a host computer and at least each third level processing element.

19. The method of claim 18 wherein said communication is established by a global bus defined in part by a backplane into which a plurality of circuit boards are inserted.

20. The method of claim 19 which further comprises:
   establishing communication between each third level processing element and an associated array of second level processing elements by way of a bus provided on a circuit board.

21. The method of claim 20 which further comprises:
   establishing communication between each second level processing element and a group of first level processing elements by way of a bus provided on an integrated circuit chip.

22. The method of claim 15 which further includes:
   representing an object in the image by three levels of binary mask representations, each mask corresponding to said first, second and third level of processing elements, respectively.

23. The method of claim 22 wherein each mask contains an array of binary bits, with each binary bit corresponding to a processing element in the given level.

24. The method of claim 15 which further comprises:
   fabricating an array of first level processing elements on an integrated circuit chip together with one second level processing element.

25. The method of claim 24 wherein each processing element consists of a module having a central processing unit and memory, and wherein the method further includes:
   constructing the memory on the chip with dual ports such that input/output lines thereof can be used to establish communication between the central processing unit of at least both the first and second level processing elements.

26. A machine for performing operations on image data in the form of a matrix of pixels, said machine comprising:
a plurality of circuit boards having connector means thereon pluggable into a backplane of a cabinet; and $N \times N$ array of integrated circuit chips located on the board, wherein N is an integer, each chip including an $mN \times mN$ array of first level processing elements, wherein mN is an integer, said first level processing elements being mesh connected to neighboring processing elements; each chip further including a second level processing element connected to each of the first level processing elements and having a different construction therefrom, said chip further including individually addressable first means for controlling selected first level processing elements so that they can operate on different instructions simultaneously, and the chip also including an individually addressable second means for controlling said second level processing element; a third level processing element of still different construction located on the board and connected to each second level processing element on the board, said third level processing element also being coupled to said connector; and means including said backplane for defining a global bus connecting each of the third level processing elements with a host computer.

27. The machine of claim 26 wherein each first level processing element includes a bit serial arithmetic logic unit communicating with a random access memory.

28. The machine of claim 26 wherein said each second level processing element comprises a multi-bit parallel processor.

29. The machine of claim 26 wherein each third level processing element comprises a general purpose microprocessor.

30. The machine of claim 26 wherein said first level processing elements are adapted to perform iconic operations on the pixels.

31. The machine of claim 26 wherein said second level processing elements are adapted to perform intermediate level symbolic operations on the pixels.

32. The machine of claim 26 wherein said third level processing elements are adapted to instruct the operation of said first and second level processing elements.

33. The machine of claim 26 wherein each chip contains at least one memory bank having dual ports with input/output lines providing access to the memory by both the first and second level processing elements.

34. A machine for performing operations on image data in the form of a matrix of pixels, said machine comprising:
a circuit board having connector means thereon pluggable into a back plane of a cabinet; $N \times N$ groups of integrated circuit devices located on the board, wherein N is an integer, each group including an $mN \times mN$ array of first level processing elements, wherein mN is an integer, said first level processing elements being mesh connected to neighboring first level processing elements; each group further including a second level processing element connected to each of the first level processing elements and having a different construction therefrom, each group further including individually addressable first means for controlling selected first level processing elements so that they can operate on different instructions simultaneously, and each group also including an individually addressable second means for controlling said second level processing element; said machine further including a third level processing element of still different construction which is connected to each second level processing element on the board, and means including said back plane for defining a bus connection to a host computer.

* * * * *